United States Patent
Cheng

(10) Patent No.: US 11,403,872 B2
(45) Date of Patent: Aug. 2, 2022

(54) TIME-OF-FLIGHT DEVICE AND METHOD FOR IDENTIFYING IMAGE USING TIME-OF-FLIGHT DEVICE

(71) Applicant: Sray-Tech LTD., Taipei (TW)

(72) Inventor: Hsun-Yu Cheng, Keelung (TW)

(73) Assignee: SRAY-TECH IMAGE CO., LTD., Taipei (TW)

( * ) Notice: Subject to any disclaimer, the term of this patent is extended or adjusted under 35 U.S.C. 154(b) by 905 days.

(21) Appl. No.: 16/214,140

(22) Filed: Dec. 10, 2018

(65) Prior Publication Data

US 2019/0377071 A1    Dec. 12, 2019

Related U.S. Application Data

(60) Provisional application No. 62/683,032, filed on Jun. 11, 2018.

(30) Foreign Application Priority Data

Sep. 18, 2018  (TW) ................................. 107132714

(51) Int. Cl.
| | |
|---|---|
| *G06V 40/16* | (2022.01) |
| *G01S 7/48* | (2006.01) |
| *G01S 17/894* | (2020.01) |
| *G06V 20/64* | (2022.01) |
| *G01S 7/481* | (2006.01) |
| *G06T 7/521* | (2017.01) |

(52) U.S. Cl.
CPC .......... *G06V 40/161* (2022.01); *G01S 7/4802* (2013.01); *G01S 7/4817* (2013.01); *G01S 17/894* (2020.01); *G06T 7/521* (2017.01); *G06V 20/64* (2022.01); *G06T 2207/10028* (2013.01); *G06T 2207/10048* (2013.01); *G06T 2207/20221* (2013.01); *G06V 40/166* (2022.01)

(58) Field of Classification Search
None
See application file for complete search history.

(56) References Cited

U.S. PATENT DOCUMENTS

| | | | | |
|---|---|---|---|---|
| 10,475,309 | B1 * | 11/2019 | Cheng | G08B 13/19 |
| 2017/0199276 | A1 * | 7/2017 | Liu | G01S 7/497 |
| 2019/0041038 | A1 * | 2/2019 | White | F21V 14/02 |

(Continued)

FOREIGN PATENT DOCUMENTS

| | | | | |
|---|---|---|---|---|
| CN | 105807284 A | | 7/2016 | |
| JP | 5512675 B2 * | | 6/2014 | H04N 5/2226 |

(Continued)

*Primary Examiner* — Reza Aghevli
(74) *Attorney, Agent, or Firm* — Winston Hsu

(57) ABSTRACT

The present invention provides a time-of-flight (TOF) device. The TOF device includes an infrared light emitter and an infrared light receiver, the infrared light emitter emits an infrared light along a first direction (X-axis), a right angle prism disposed on a movable base, and the infrared light passes through the right angle prism. A first actuator and a second actuator are respectively disposed beside the movable base. By actuating the first actuator, the right angle prism is tilted toward a second direction (Y axis), and by actuating the second actuator, the right angle prism is tilted toward a third direction (Z axis), and the second direction and the third direction are both perpendicular to the first direction.

15 Claims, 4 Drawing Sheets

(56) References Cited

U.S. PATENT DOCUMENTS

| | | | | |
|---|---|---|---|---|
| 2019/0217477 | A1* | 7/2019 | Paepcke | G05B 19/4189 |
| 2019/0255989 | A1* | 8/2019 | Rowell | G06V 20/597 |
| 2019/0346687 | A1* | 11/2019 | Zheng | G02B 27/425 |
| 2019/0347805 | A1* | 11/2019 | Potthast | G06T 7/70 |
| 2019/0376797 | A1* | 12/2019 | Walls | G01C 21/3602 |
| 2019/0377358 | A1* | 12/2019 | Zapolsky | G06T 19/006 |

FOREIGN PATENT DOCUMENTS

| | | | | |
|---|---|---|---|---|
| TW | 200704911 | | 2/2007 | |
| TW | 201632949 A | | 9/2016 | |
| WO | WO-2010058001 A | * | 5/2010 | G01B 11/002 |
| WO | WO-2017199531 A1 | * | 11/2017 | A61B 1/00 |
| WO | 2017/212601 A1 | | 12/2017 | |
| WO | 2018/064087 A1 | | 4/2018 | |
| WO | WO-2018194464 A9 | * | 5/2019 | A01B 79/005 |
| WO | WO-2021032298 A1 | * | 2/2021 | G01B 11/03 |

* cited by examiner

TIME-OF-FLIGHT DEVICE AND METHOD FOR IDENTIFYING IMAGE USING TIME-OF-FLIGHT DEVICE

CROSS REFERENCE TO RELATED APPLICATIONS

This application claims the benefit of U.S. Provisional Application No. 62/683,032, filed on Jun. 11, 2018 and entitled "Increased TOF resolution scanning structure", the contents of which are incorporated herein.

BACKGROUND OF THE INVENTION

1. Field of the Invention

The present invention relates to the field of optics, and more particularly to an improved time-of-flight device, and a method for identifying images using the time-of-flight device described above. Besides, the time-of-flight device of the present invention has higher resolution.

2. Description of the Prior Art

A time-of-flight (TOF) device is a three-dimension (3D) sensing device. The principle is to emit a light source (for example, infrared light) to the target object, and then receive the infrared light reflected by the target object, and determine the distance between the device and the target object by calculating the time difference between the infrared light emission and the reception.

An infrared light receiving area of the time-of-flight device comprises a plurality of photosensitive area arrays, each photosensitive area can represent a pixel, and that is to say, the number of the photosensitive areas is representative of the resolution of the time-of-flight device. The higher the number of photosensitive areas of the time-of-flight device has, the higher the resolution of the time-of-flight device.

However, since the intensity of the infrared light reflected by the target object is weakened, each photosensitive area should maintain a certain area to effectively receive the reflected infrared light. As a result, the total number of photosensitive areas will be limited, that is, the resolution will not be effectively improved. In the current technology, the resolution of the time-of-flight device is hard to exceed the standard VGA (video graphics array) image quality, which is 640*480. Most time-of-flight devices have a resolution of 320*240 or even lower resolution.

Therefore, in the current technology, the resolution of the time-of-flight device is insufficient, which is disadvantageous for the function of face recognition. For example, please refer to FIG. 1, which illustrates a schematic diagram of a time-of-flight device with insufficient resolution applied to the face recognition function. As shown in FIG. 1, a time-of-flight (TOF) device 100 is provided on a gate 102, when a target object (such as a human body) 104 approaches the gate 102, the TOF device 100 is activated and to perform face recognition. However, if the TOF device 100 is activated while the target object 104 is still far from the gate 102 (L1, for example, 3 meters or more), the recognized face area is too small and the resolution is insufficient, so that the detailed features of the face cannot be clearly known, which affects subsequent identity certification. On the other hand, if the TOF device 100 is activated while the target object 104 is closer to the gate (for example, L2, assuming 1 meter or less), although the detailed features of the recognized face can be clearly determined, but face area may exceed the active screen area.

Therefore, if the resolution of the time-of-flight device can be improved, the above problem can be effectively solved.

SUMMARY OF THE INVENTION

The present invention provides a time-of-flight (TOF) device, the TOF device includes an infrared light emitter and an infrared light receiver, the infrared light emitter emits a infrared light along a first direction, a right angle prism disposed on a movable base, the infrared light passes through the right angle prism, and a first actuator and a second actuator, respectively disposed beside the movable base, wherein by actuating the first actuator, the right angle prism is tilted toward a second direction, and by actuating the second actuator, the right angle prism is tilted toward a third direction, and the second direction and the third direction are both perpendicular to the first direction.

The present invention further provides a method for identifying an image using a time-of-flight (TOF) device. Firstly, a time-of-flight device is provided, the time-of-flight device includes an infrared light emitter and an infrared light receiver, the infrared light emitter emits an infrared light along a first direction, a right angle prism disposed on a movable base, the infrared light passes through the right angle prism, and a first actuator and a second actuator, respectively disposed beside the movable base, wherein by actuating the first actuator, the right angle prism is tilted toward a second direction, and by actuating the second actuator, the right angle prism is tilted toward a third direction, and the second direction and the third direction are both perpendicular to the first direction. Afterwards, when a target object is close to the time-of-flight device, the time-of-flight device is activated to identify a first range of the target object, and obtain a first three dimension (3D) identification result image, next, an angle of the right angle prism is adjusted by actuating the first actuator and the second actuator, and changing an irradiation angle of the infrared light, and after the irradiation angle of the infrared light is changed, the second range of the target object is recognized, and to obtain a second 3D identification result image.

The invention provides an improved time-of-flight device, which uses an actuator to control the angle of the right angle prism, thereby changing the illumination angle of the infrared light, so that the time-of-flight device has the scanning function. The resolution and detectable range of the original time-of-flight device are a fixed value, if the scanning function is used, the target object is divided into different regions, those regions are scanned and identified separately, and then the different 3D identification result images of different regions are synthesized into one 3D identification result image. As a result, the resolution and detection range of the TOF device will be greatly improved.

These and other objectives of the present invention will no doubt become obvious to those of ordinary skill in the art after reading the following detailed description of the preferred embodiment that is illustrated in the various figures and drawings.

DETAILED DESCRIPTION

To provide a better understanding of the present invention to users skilled in the technology of the present invention, preferred embodiments are detailed as follows. The preferred embodiments of the present invention are illustrated in the accompanying drawings with numbered elements to clarify the contents and effects to be achieved.

Please note that the figures are only for illustration and the figures may not be to scale. The scale may be further modified according to different design considerations. When referring to the words "up" or "down" that describe the relationship between components in the text, it is well known in the art and should be clearly understood that these words refer to relative positions that can be inverted to obtain a similar structure, and these structures should therefore not be precluded from the scope of the claims in the present invention.

Figure 2:
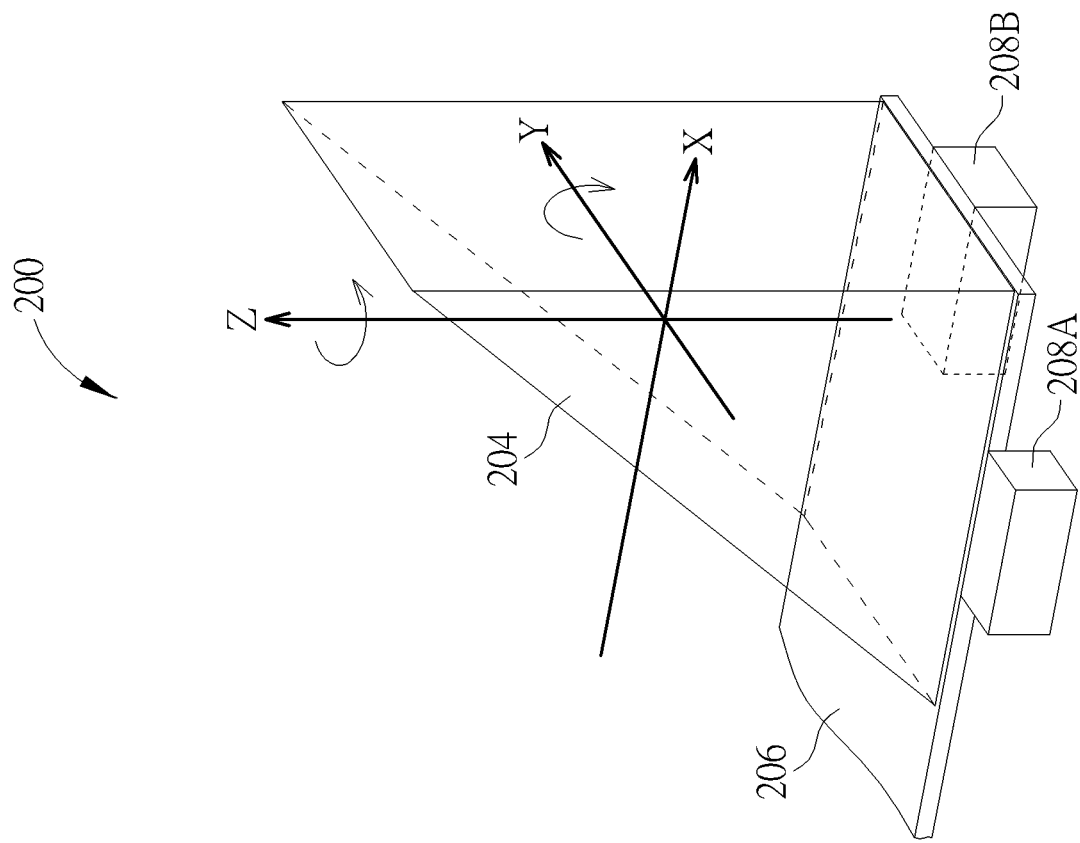
FIG. 2 is a schematic structural view of a time-of-flight device of the present invention.
Figure 2:
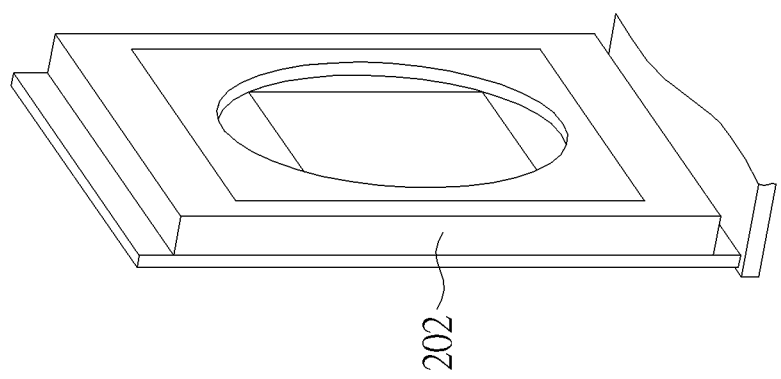

The present invention provides an improved time-of-flight device that solves the problems mentioned above. First, please refer to FIG. 2, which is a schematic structural view of the time-of-flight device of the present invention. As shown in FIG. 2, the time-of-flight device 200 of the present invention includes at least a main portion 202 and a right angle prism 204, the right angle prism 204 is disposed on a movable base 206, two actuators: a first actuator 208A and a second actuator 208B are respectively disposed beside the movable base 206 (for example, respectively disposed along the Y-axis and the Z-axis in FIG. 2). The main portion 202 includes a light source emitting device and a light source receiving device, the light source emitting device is, for example, an infrared light emitting device, and the light source receiving device is, for example, an infrared light receiving device. The infrared light emitting device is configured to emit a single laser infrared light or simultaneously emit multiple laser infrared light, and the emitted infrared light will be reflected after being irradiated to a target object (not shown). In general, the infrared light receiving device includes an array of photosensitive regions for receiving infrared light reflected by the target object, and the main portion 202 further includes a memory and a processor for recording the time difference between the emission and reception of the infrared light. And calculate the distance between the device and the target object. Briefly, the main portion 202 of the time-of-flight device 200 of the present invention has the same function as a conventional time-of-flight device, in other words, the main portion 202 of the time-of-flight device 200 of the present invention can determine the distance and depth of the target object by calculating the emitting and receiving infrared light. Since the conventional time-of-flight device is a known technology, it will not be described here.

As mentioned above, in order to effectively receive the reflected infrared light, the resolution of the current time-of-flight device will be limited. Regarding the main portion 202 of the time-of-flight device 200 in the present invention, assuming the highest resolution is W*H. Here W is the number of lateral pixels of the screen of the time-of-flight device, and H is the number of vertical pixels of the screen of the time-of-flight device. For example, in the current technology, assuming the highest resolution that the main portion 202 can have in the present embodiment is 320*240, but the present invention is not limited thereto. In other words, in the present invention, the improved time-of-flight ranging device 200 includes a main portion 202 having a resolution of W*H (this portion is equal to a conventional full time-of-flight device) and another part (for example, a right angle prism 204, a movable base 206 and the actuators 208A, 208B).

In the present invention, the right angle prism 204 is disposed on the movable base 206, and the TOF device 200 further comprises two actuators, defined as a first actuator 208A and a second actuator 208B, and respectively disposed beside the movable base 206 along two different directions. The first actuator 208A and the second actuator 208B include a voice coil motor (VCM), a micro electro mechanical system (MEMS), a shape memory alloy (SMA), or other suitable device that can be controlled by an electronic signal and causing structural changing. In this embodiment, the angle of the movable base 206 is changed by activating the first actuator 208A or the second actuator 208B, the variable angle (tiltable angle) of the movable base 206 is preferably greater than or equal to 100 degrees, but is not limited thereto. In more detail, the infrared light emitted by the main portion 202 will pass through the right angle prism 204 along a first direction (for example, the X-axis in FIG. 2), and will be reflected by the right angle prism 204, to irradiate toward another direction (for example, Z-axis). In other words, the lens of the time-of-flight device (not shown) is disposed in the Z-axis direction, in this way, the configuration can effectively save the internal space, which is advantageous for miniaturization of the overall structure. The first actuator 208A is disposed adjacent to the movable base 206, and when the first actuator 208A is activated, the right angle prism 204 will be tilted or be rotated along a second direction (e.g., the Y-axis). On the other hand, the second actuator 208B is also disposed beside the movable base 206, and when the second actuator 208B is activated, the right angle prism 204 will be tilted or be rotated along a third direction (e.g., the Z-axis). The first direction, the second direction, and the third direction are all perpendicular to each other. Therefore, by activating the first actuator 208A or the second actuator 208B, the position or the angle of the movable base 206 and the right angle prism 204 can be changed. Therefore, when the infrared light emitted by the main portion 202 passing through the right angle prism 204, the direction of illumination of the infrared light can be controlled by the right angle prism 204.

In the present invention, by adjusting the first actuator 208A and the second actuator 208B, the illumination direction of the infrared light emitted by the main portion 202 can be changed, thereby achieving the effect of scanning function. In more detail, the resolution and/or the detectable range of the original main portion 202 is a fixed area. If the scanning function is used, the target object can be divided into different regions, and then the different regions are scanned and identified sequentially. Afterwards, the identification result images of different regions are synthesized, and a final 3D identification result image is obtained. For example, if the target object is divided into four regions (for example, the upper left region, the upper right region, the lower left region, and the lower right region), the identification step is sequentially performed, and the respective identification result images are combined into one final identification result image. In this way, the detection range will be four times that of the original detection range, and the resolution is four times that of the original. That is 2W*2H, for example, if the original resolution of the main portion 202 is 320*240, the resolution of the final identification result image synthesized by four different identification result images should be 640*480.

Figure 1:
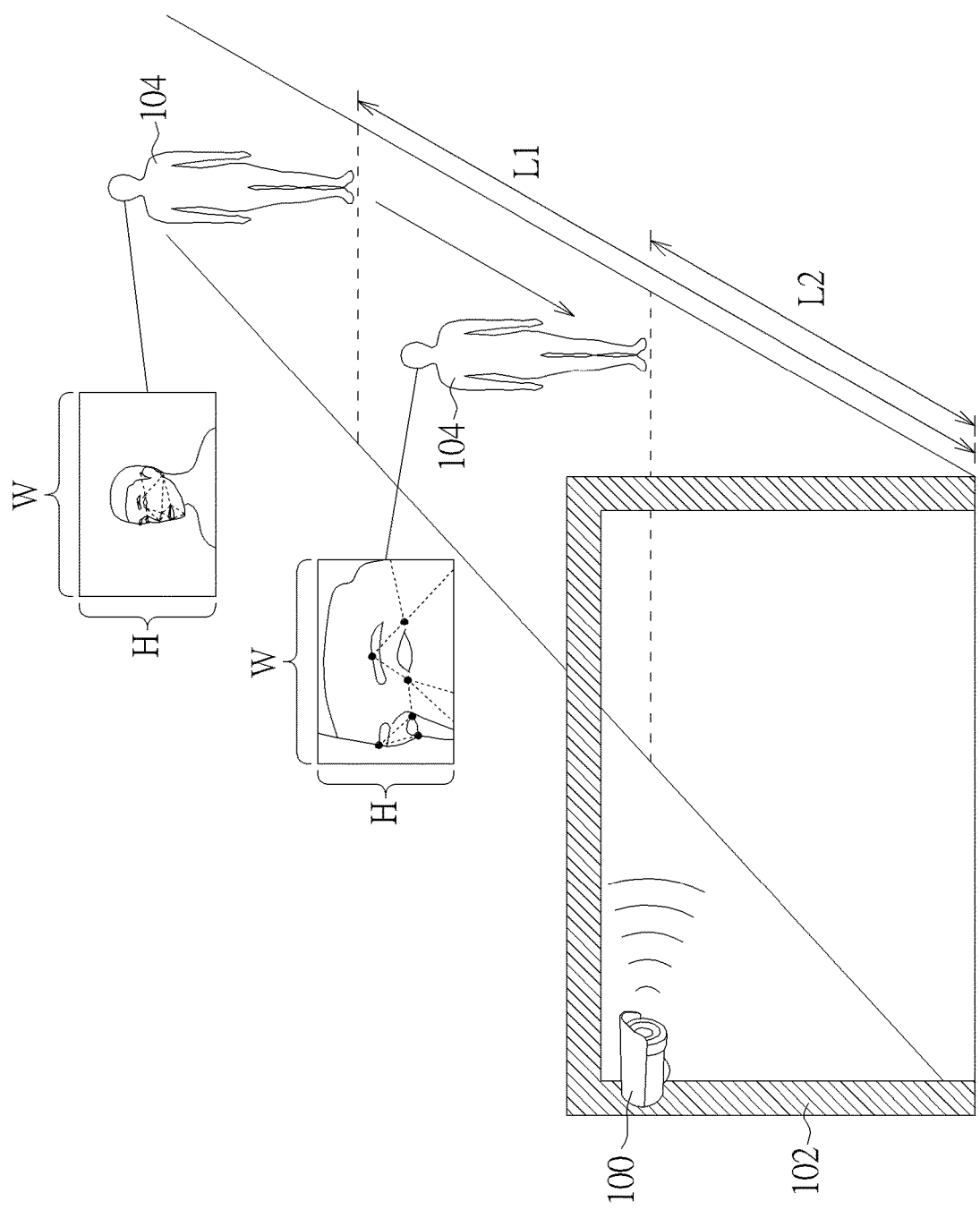
FIG. 1 is a schematic diagram of a time-of-flight device with insufficient resolution applied to face recognition.
Figure 3:
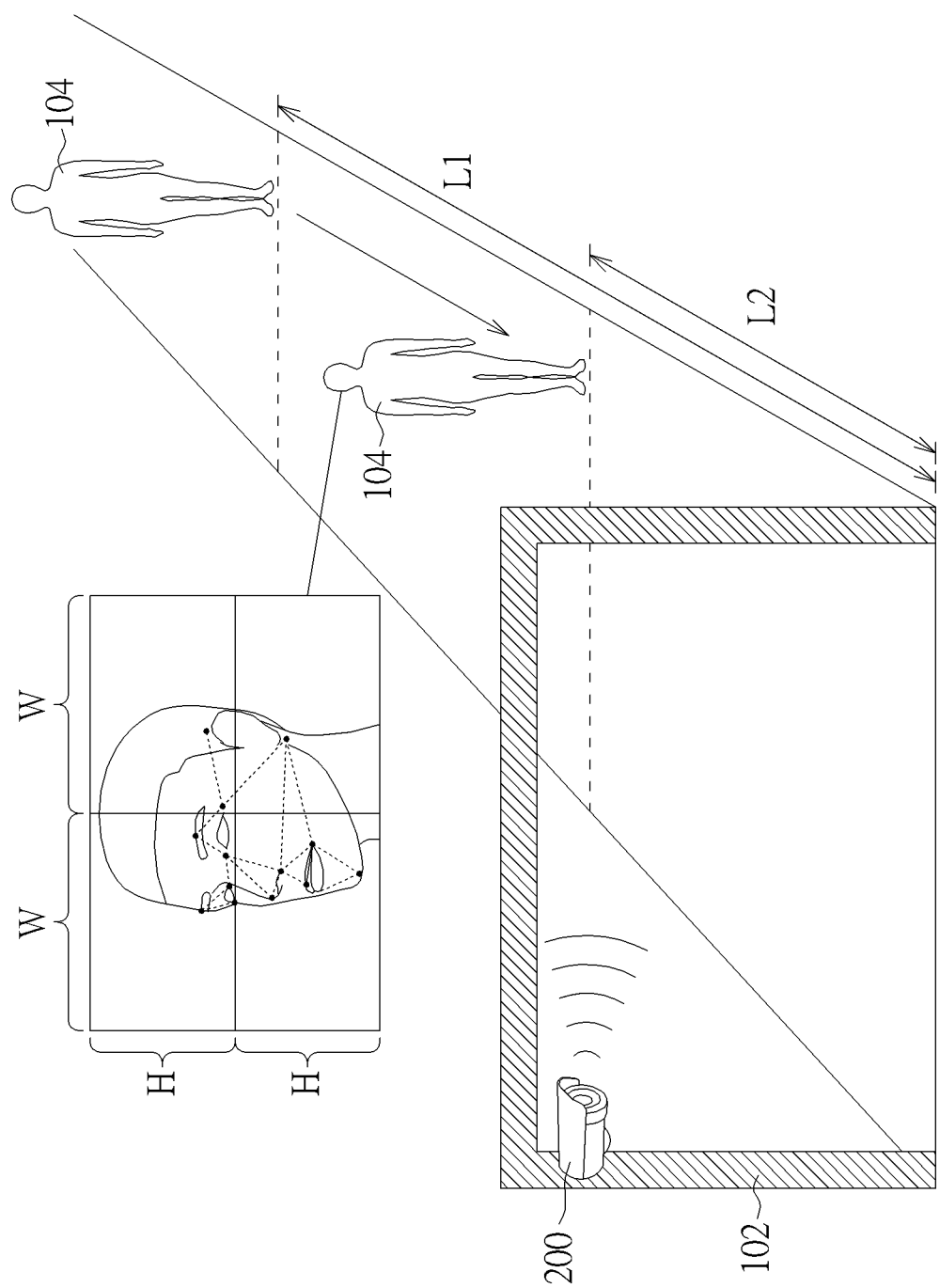
FIG. 3 is a schematic view showing the application of the improved time-of-flight device of the present invention applied to face recognition.

FIG. 3 is a schematic diagram of applying the improved time-of-flight device 200 of the present invention to face recognition. As shown in FIG. 3, a time-of-flight device 200 is disposed on a gate 102. When a target object (such as a human body) 104 approaches the time-of-flight device 200, the time-of-flight device 200 is activated and the face recognition process is performed. Different from the case shown in FIG. 1, in the present embodiment, when the target object 104 is sufficiently close to the time-of-flight device 200 (for example, the distance is L2), the time-of-flight device 200 will perform the face recognition process multiple times, to sequentially identify different regions of the face (target), and finally the identification results of different regions are synthesized. As shown in FIG. 3, in the embodiment, the range of the face is divided into four different regions, namely, an upper left region, an upper right region, a lower left region, and a lower right region, each region is respectively scanned and identified, and each region has its own W*H resolution. It should be noted that the step of identifying each region includes transmitting an infrared light by the time-of-flight device 200 to illuminate a partial range of the human face, and then the infrared light reflected by the human face is received by the time-of-flight device 200. The infrared light receiving device receives and calculates the distance and depth of the human face by measuring the time difference between the infrared light emission and reception, and obtains a 3D identification result image. Furthermore, the different regions described above may not overlap with each other, or partially overlap with each other (e.g., they may partially overlap with each other near the boundary). In this embodiment, the face range is divided into four different regions as an example, and the final 3D identification result image has four times resolution, which is equivalent to 2W*2H, and the 3D identification result image can also accommodate the full face size, which is beneficial to determinate the detail face features and to the subsequent authentication steps.

It can be understood that in the above method, the target object (for example, a human face) is divided into four regions, and then the face recognition step is sequentially performed in sequence. However, in other embodiments of the present invention, the target object may be divided into more or less regions, only if target object is divided into two or more regions, it should be within the scope of the present invention. Accordingly, the present invention provides a TOF device having higher resolution, and a method of identifying a target object using the above TOF device. For example, the highest resolution of the originally main portion 202 of the TOF device 200 usually does not exceed 640*480, for example, 320*240. However, by using the method of the present invention, that is, scanning different regions, and synthesizing the identification result image of each region, the resolution of the final 3D identification result image will be greater than or equal to 640*480, for example, a resolution of 1280*960 or higher.

Figure 4:
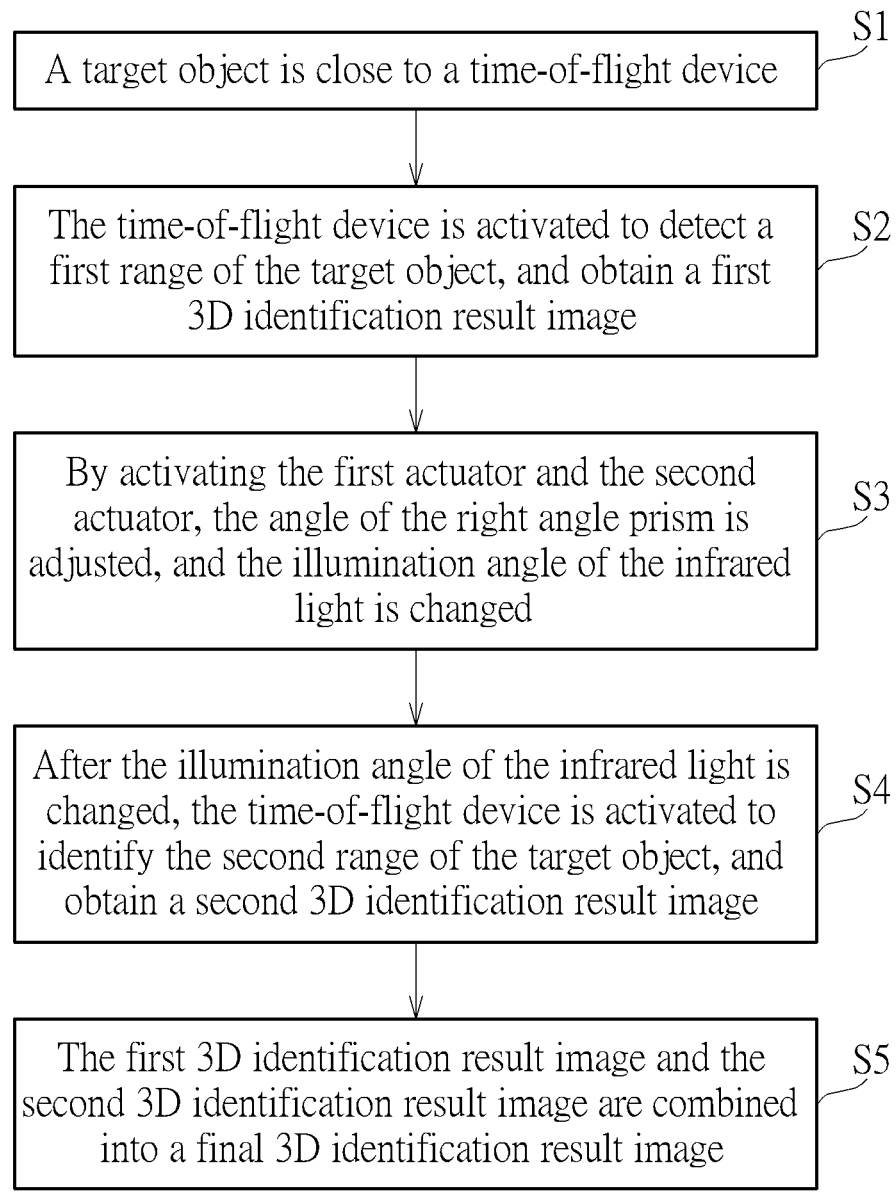
FIG. 4 is a flow chart showing the identification of images by the time-of-flight device of the present invention.

Please refer to FIG. 4, which illustrates a flow chart for recognizing an image by using the time-of-flight device of the present invention. First, as step S1, a target object (such as a human face) is close to a time-of-flight device, and then as shown in step S2, the time-of-flight device is activated to detect a first range of the target object, and obtain a first 3D identification result image. Afterwards, as shown in step S3, by activating the first actuator and the second actuator, the angle of the right angle prism is adjusted, and the illumination angle of the infrared light is changed. Next, in step S4, after the illumination angle of the infrared light is changed, the time-of-flight device is activated to identify the second range of the target object, and obtain a second 3D identification result image, and then, as shown in step S5, the first 3D identification result image and the second 3D identification result image are combined into a final 3D identification result image. It should be noted that in the flow of FIG. 4, two different regions of the target object are respectively identified, so that the first 3D identification result image and the second 3D identification result image are respectively generated, but in other embodiments of the present invention, the target object can be divided into more regions, and more 3D identification result images will be generated, in this case, there may be other steps for adjusting the right angle prism and for face recognition between step S4 and step S5. Finally, all the 3D identification result images are combined. In this way, the final 3D identification result image has higher resolution. This step is also within the scope of the present invention.

In summary, the invention provides an improved time-of-flight device, which uses an actuator to control the angle of the right angle prism, thereby changing the illumination angle of the infrared light, so that the time-of-flight device has the scanning function. The resolution and detectable range of the original time-of-flight device are a fixed value, if the scanning function is used, the target object is divided into different regions, those regions are scanned and identified separately, and then the different 3D identification result images of different regions are synthesized into one final 3D identification result image. As a result, the resolution and detection range of the TOF device will be greatly improved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A time-of-flight (TOF) device, comprising:
an infrared light emitter and an infrared light receiver, the infrared light emitter emits a infrared light along a first direction;
a right angle prism disposed on a movable base, the infrared light passes through the right angle prism; and
a first actuator and a second actuator, respectively disposed beside the movable base, wherein by actuating the first actuator, the right angle prism is tilted toward a second direction, and by actuating the second actuator, the right angle prism is tilted toward a third direction, and the second direction and the third direction are both perpendicular to the first direction.

2. The time-of-flight device of claim 1, wherein the first actuator and the second actuator comprise a voice coil motor (VCM), a micro electro mechanical system (MEMS) or a shape memory alloy (SMA).

3. The time-of-flight device of claim 1, wherein the movable base has a variable angle greater than or equal to 100 degrees.

4. The time-of-flight device of claim 1, wherein the infrared light emitted by the infrared light emitter is reflected toward the third direction after being reflected by the right angle prism.

5. The time-of-flight device of claim 4, wherein the infrared light is irradiated to a target object, and the infrared light reflected by the target object is received by the infrared light receiver.

6. The time-of-flight device of claim 1, wherein a resolution of the time-of-flight device is less than or equal to 640*480.

7. A method for identifying an image using a time-of-flight (TOF) device, comprising:
   providing a time-of-flight device, the time-of-flight device comprising:
      an infrared light emitter and an infrared light receiver, the infrared light emitter emits an infrared light along a first direction;
      a right angle prism disposed on a movable base, the infrared light passes through the right angle prism; and
      a first actuator and a second actuator, respectively disposed beside the movable base, wherein by actuating the first actuator, the right angle prism is tilted toward a second direction, and by actuating the second actuator, the right angle prism is tilted toward a third direction, and the second direction and the third direction are both perpendicular to the first direction;
   when a target object is close to the time-of-flight device, the time-of-flight device is activated to identify a first range of the target object, and obtain a first three dimension (3D) identification result image;
   adjusting an angle of the right angle prism by actuating the first actuator and the second actuator, and changing an irradiation angle of the infrared light; and
   after the irradiation angle of the infrared light is changed, the second range of the target object is recognized, and to obtain a second 3D identification result image.

8. The method of claim 7, further comprising synthesizing the first 3D identification result image and the second 3D identification result image into a final 3D identification result image.

9. The method of claim 8, wherein the resolution of the final 3D identification result image is greater than or equal to 640*480.

10. The method of claim 7, wherein the resolution of the time-of-flight device is less than or equal to 640*480.

11. The method of claim 7, wherein the step of obtaining the first 3D identification result image includes:
   emitting an infrared light from the infrared light emitter to illuminate a portion of the target object;
   receiving the infrared light reflected by the target object by the infrared light receiver;
   measuring the time difference between the infrared light and the reflected infrared light, to calculate the distance and depth of the target object, and to obtain the first 3D identification result image.

12. The method of claim 7, wherein the first range of the target object and the second range of the target object do not overlap with each other.

13. The method of claim 7, wherein the first range of the target object and the second range of the target object partially overlap with each other.

14. The method of claim 7, wherein the first actuator and the second actuator comprise a voice coil motor (VCM), a micro electro mechanical system (MEMS) or a shape memory alloy (SMA).

15. The method of claim 7, wherein the movable base has a variable angle greater than or equal to 100 degrees.

* * * * *